United States Patent
Liu et al.

(10) Patent No.: US 8,940,261 B2
(45) Date of Patent: Jan. 27, 2015

(54) CONTAMINANT-TOLERANT SOLVENT AND STRIPPING CHEMICAL AND PROCESS FOR USING SAME FOR CARBON CAPTURE FROM COMBUSTION GASES

(75) Inventors: Kunlei Liu, Lexington, KY (US); James Kyle Neathery, Lexington, KY (US); Joseph Eugene Remias, Lexington, KY (US)

(73) Assignee: The University of Kentucky Research Foundation, Lexington, KY (US)

( * ) Notice: Subject to any disclaimer, the term of this patent is extended or adjusted under 35 U.S.C. 154(b) by 609 days.

(21) Appl. No.: 13/249,567

(22) Filed: Sep. 30, 2011

(65) Prior Publication Data

US 2012/0082604 A1     Apr. 5, 2012

Related U.S. Application Data

(60) Provisional application No. 61/388,340, filed on Sep. 30, 2010.

(51) Int. Cl.
| | |
|---|---|
| *B01D 53/62* | (2006.01) |
| *B01D 53/14* | (2006.01) |
| *B01D 53/78* | (2006.01) |
| *B01D 53/96* | (2006.01) |

(52) U.S. Cl.
CPC ........ *B01D 53/1425* (2013.01); *B01D 53/1475* (2013.01); *B01D 2252/102* (2013.01); *B01D 2252/20484* (2013.01); *B01D 2252/20489* (2013.01); *B01D 2252/504* (2013.01); *B01D 2258/0283* (2013.01); *Y02C 10/04* (2013.01); *Y02C 10/06* (2013.01)
USPC ............ 423/228; 423/220; 423/229; 423/234

(58) Field of Classification Search
None
See application file for complete search history.

(56) References Cited

U.S. PATENT DOCUMENTS

| | | | |
|---|---|---|---|
| 3,864,449 A | 2/1975 | Homberg | |
| RE29,428 E | 10/1977 | Homberg | |
| 4,434,144 A | 2/1984 | Giammarco | |
| 5,163,374 A * | 11/1992 | Rehmat et al. | ................ 110/342 |
| 7,255,842 B1 | 8/2007 | Yeh | |
| 7,641,717 B2 | 1/2010 | Gal | |
| 8,425,655 B2 * | 4/2013 | Chen et al. | ........................ 95/16 |
| 2009/0155889 A1 | 6/2009 | Handagama | |
| 2010/0003177 A1 | 1/2010 | Aroonwilas | |

OTHER PUBLICATIONS

The Engineering ToolBox, "Water—Thermal Properties." (no date) Viewed on May 5, 2014 at http://www.engineeringtoolbox.com/water-thermal-properties-d_162.html.*
Dawson, Jr., et al., "Volumetric Behavior, Vapor Pressures, and Critical Properties of Neopentane." J. Chem. Eng. Data, vol. 18, No. 1 (1973), pp. 7-15.*

* cited by examiner

*Primary Examiner* — Stanley Silverman
*Assistant Examiner* — Daniel Berns
(74) *Attorney, Agent, or Firm* — King & Schickli, PLLC

(57) ABSTRACT

A contaminant-tolerant hybrid scrubbing solvent is provided for post-combustion $CO_2$ capture and removal, the scrubbing solvent including an amine and a low fraction of ammonia. A stripping carrier having a low latent energy is included for solvent regeneration. In one embodiment, the amine is MEA and the stripping chemical having low latent energy is pentane or an isomer thereof. Processes and apparatus for CO2 removal from post-combustion gases and for solvent regeneration are described.

7 Claims, 12 Drawing Sheets

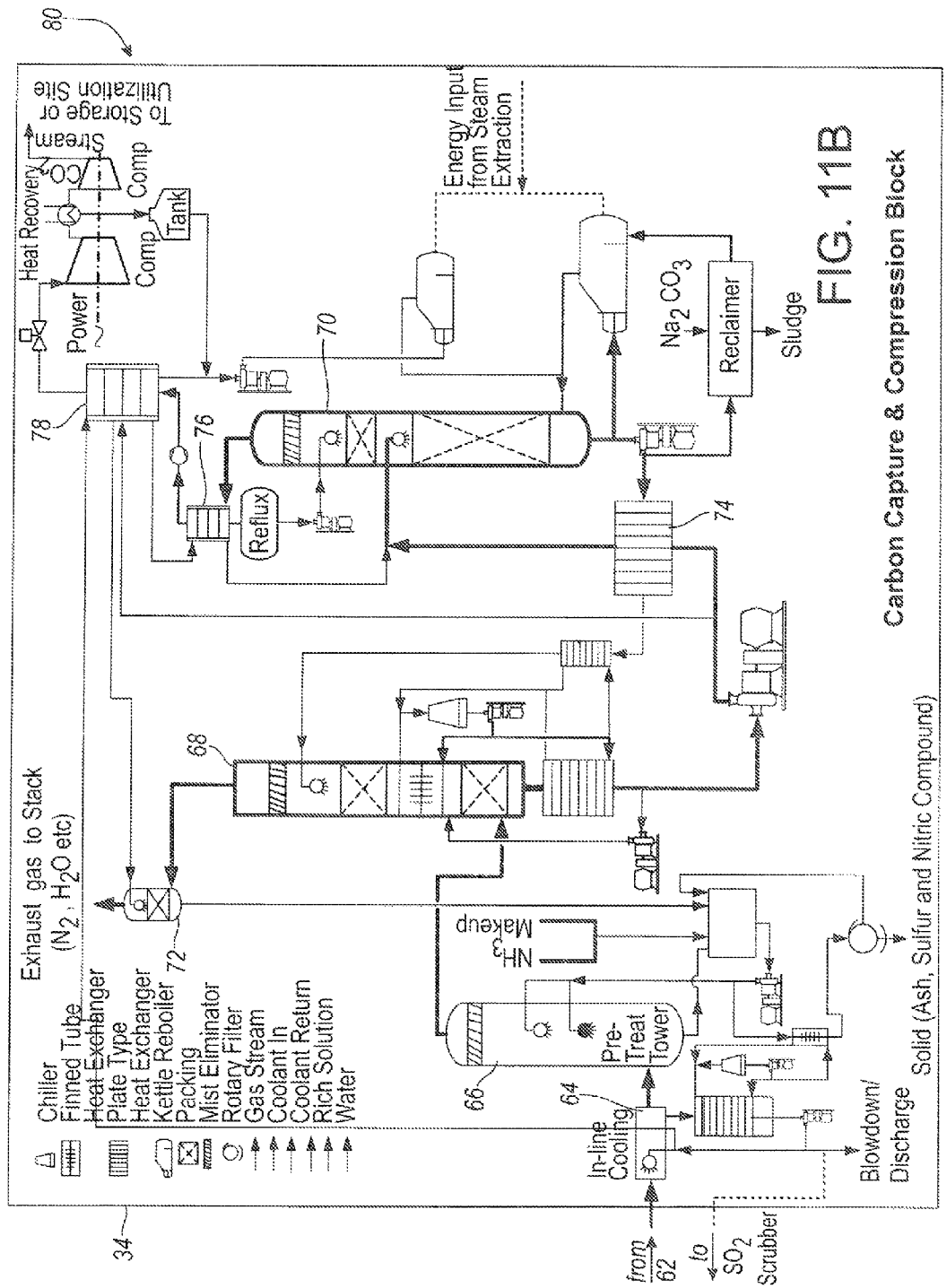

CONTAMINANT-TOLERANT SOLVENT AND STRIPPING CHEMICAL AND PROCESS FOR USING SAME FOR CARBON CAPTURE FROM COMBUSTION GASES

This application claims priority to U.S. Provisional Patent Application Ser. No. 61/388,340 filed 30 Sep. 2010, the entire disclosure of which is incorporated herein by reference.

TECHNICAL FIELD

The present disclosure relates to a contaminant-tolerant solvent/stripping chemical hybrid, i.e. a scrubbing solvent, and to a process for its use. In particular, the disclosure relates to use of a solvent mixture of an amine and a low concentration of ammonia ($NH_3$) for $CO_2$ removal, and a chemical having a low latent energy as a stripping carrier within a desorber for solvent regeneration. The process and solvent find utility in post-combustion carbon dioxide ($CO_2$) capture, such as from utility flue gases in coal-fired power plants.

BACKGROUND OF THE INVENTION

In a typical coal-fired power plant, coal is burned in a boiler to make high temperature and pressure steam to drive a steam turbine and electricity generator. For the steam-side process, the initial superheated steam drives the high-pressure turbine first for power generation, before returning to the boiler for reheating to bring steam temperature back to over 540° C. (according to the steam cycle specifications and boiler design). The reheated steam then enters intermediate-pressure and low-pressure turbines to generate additional electricity. The steam pipe connecting the intermediate-pressure turbine exhaust and the low-pressure turbine inlet is called the cross-over section, where the steam for solvent regeneration in the $CO_2$ capture process is extracted. The exiting saturated steam from the low-pressure turbine is condensed in a water-to-steam heat exchanger (or condenser). The condensate is pressurized via feedwater pumps, heated via feedwater heaters and economizers, and fed back to the boiler to complete the steam cycle.

For the gas-side process, typically after combustion of the coal in low NOx burners the combustion gases leave the boiler and are treated in a NOx removal device called a Selective Catalytic Reduction (SCR). After the SCR treatment, the gas is further treated in a fly ash removal device, such as an electrostatic precipitator, to remove particulates. After this treatment, the gas is routed through an $SO_2$ removal device ($SO_2$ scrubber). At this point, the carbon capture process begins.

It is known in the art to use scrubbing solvents for capturing $CO_2$ from post-combustion gases, such as from utility flue gases. As an example, a conventional solvent often used is 30 weight percent monoethanolamine (MEA). Likewise, it is known to use solvents comprising $K_2CO_3/KHCO_3$ or $NH_3$. Such conventional solvents, while generally effective for their intended purpose, can be markedly improved in terms of $CO_2$ adsorption and recovery, required operating temperatures, energy requirements, and the like.

To solve the aforementioned and other problems, the present disclosure provides a mixed solvent including an amine and a low fraction of ammonia for $CO_2$ removal, and further provides a stripping carrier having a low latent energy for solvent regeneration. Likewise, herein is disclosed a process for using the mixed solvent/stripping carrier in post-combustion $CO_2$ capture. This mixed solvent provides multiple advantages, including: (1) higher mass-transfer flux which results in a smaller absorber to capture the same amount of $CO_2$ from the flue gas stream; (2) higher carbon capacity, which reduces the liquid recycling rate between the absorber and the stripper, increases $CO_2$ dissociated partial pressure and reduces the stripper size; and (3) less energy demand for $CO_2$ stripping. The ammonia (i) reduces sulfur dioxide ($SO_2$) levels in the pre-treatment tower to a suitable concentration to minimize MEA degradation; (ii) acts (in vapor form) as a carrier gas which reduces $CO_2$ vapor pressure in the stripper; and (iii) enhances reaction kinetics and increases the solvent capacity.

SUMMARY OF THE INVENTION

In accordance with the purposes and advantages of the present invention as described herein, in one aspect of the present disclosure a contaminant-tolerant solvent/stripping chemical hybrid process is described. The process uses a mixture of an amine and a low fraction of ammonia as reagents for $C_2$ removal, and also uses a chemical with a low latent energy as a stripping carrier for solvent regeneration, all for post-combustion $CO_2$ capture. In one embodiment, the amine is MEA. Other suitable amines are contemplated, including without limitation 2-Amino-2-methylpropanol (AMP), methyldiethanolamine (MDEA), Piperazine (PZ), Diglycolamine (DGA), Ethylenediamine (EDA), Tri(Hydroxymethyl)Aminomethane (THAM), Diethanolamine (DEA), DIPA (di-isopropanolamine), and amino acids.

Inclusion of a low fraction of ammonia minimizes ammonia slip, for example in scrubber and stripper exhaust streams. Ammonia reduces $SO_2$ levels in pretreatment processes to a suitable concentrations, minimizing MEA degradation according to the reaction:

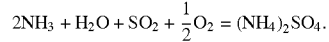

$$2NH_3 + H_2O + SO_2 + \frac{1}{2}O_2 = (NH_4)_2SO_4.$$

The resulting solution can then be cooled, whereby the sulfate solids precipitate and can be removed. In turn, ammonia vapor acts as a carrier gas. Since the stripper temperature is above 60° C., ammonium carbon-compounds will dissociate into $NH_3$, $CO_2$ and $H_2O$ which will reduce the $CO_2$ vapor pressure in a stripper.

Broadly, any suitable stripping carrier having low latent energy is contemplated, with the proviso that stripping carriers having the properties of immiscibility in water and a latent heat/heat of vaporization less than that of water are contemplated. Generally, such compounds having a normal boiling point range less than 90° C. are contemplated. In one embodiment, pentane or isomers thereof, including without limitation n-pentane and iso-pentane, and/or n-hexane are used as the stripping carrier. Compared to conventional solvents for $CO_2$ capture, the present hybrid solvent provides a higher mass-transfer flux in the conventional working carbon loading range; an increased actual carbon capacity, and a reduced energy demand for $CO_2$ stripping.

In turn, in another aspect of the present disclosure, a process for stripping $CO_2$ from post-combustion gases, for example from utility flue gases emanating from coal-fired power plants, is provided utilizing the above mixed solvent. Advantageously, the present technology readily incorporates into existing infrastructure.

In the following description there are shown and described several different embodiments, simply by way of illustration of some of the modes best suited to carry out the invention. As it will be realized, the described subject matter is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated herein and forming a part of the specification, illustrate several aspects of the present invention and together with the description serve to explain certain principles of the invention. In the drawings.

Figure 1:
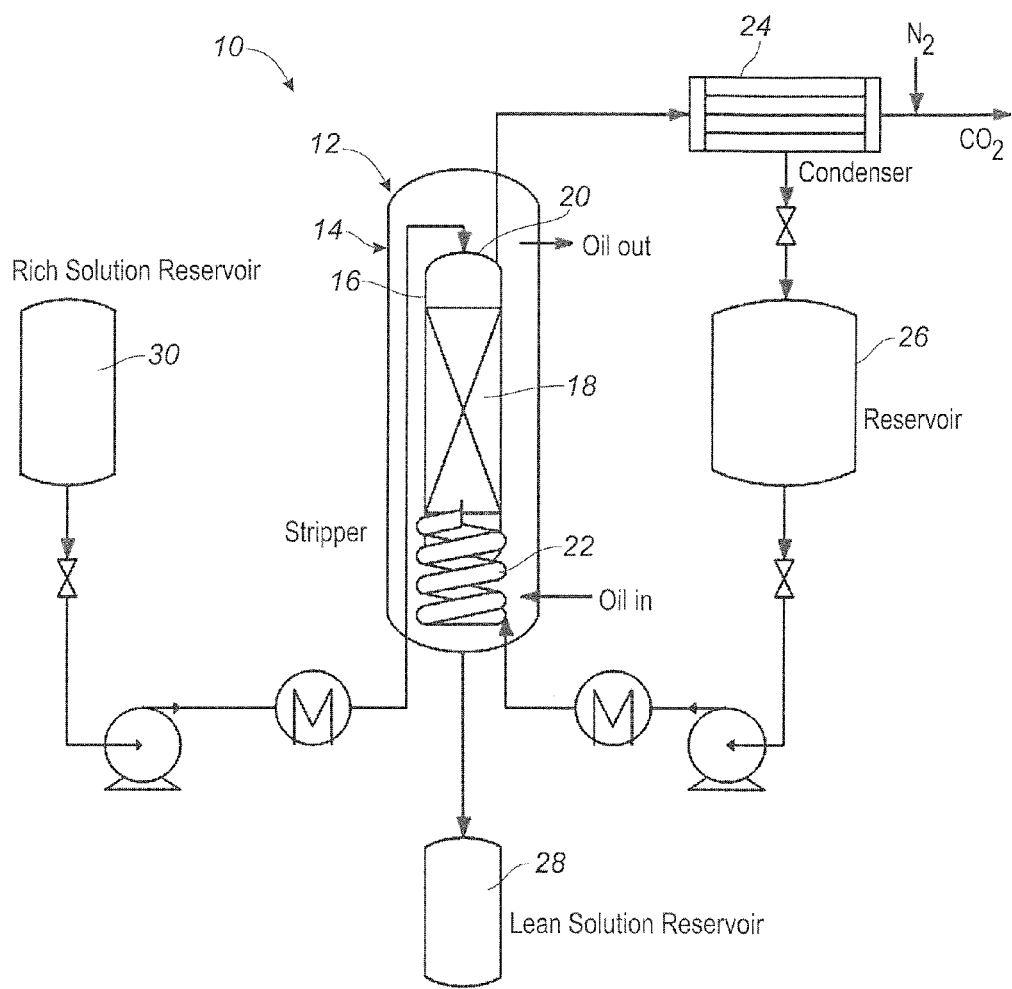
FIG. 1 schematically shows a laboratory scale $CO_2$ stripping apparatus according to the present disclosure.

Reference will now be made in detail to the present preferred embodiment of the invention, examples of which are illustrated in the accompanying drawings.

DETAILED DESCRIPTION OF THE INVENTION

In more detail, the proposed mixed solvent involves reactions with $CO_2$ and individual amines (as stripping carriers) and/or $NH_3$ as a promoter to increase carbon capacity of the solvent. Advantageously, ammonia is readily available, relatively inexpensive, and is already used in power plants for $NO_x$ reduction. In turn, an additional benefit is provided for $SO_2$ removal, potentially producing fertilizer and eliminating the need for the current practice of flue gas polishing prior to entering an amine scrubber.

The reactions involving $CO_2$ with stand-alone amines or $NH_3$ operate via known mechanisms. As an example, the mechanism for $CO_2$ capture using MEA alone (as is conventional in the art) involves three steps: (1) MEA hydrolyzing to form $MEA^+$ and $OH^-$; (2) gaseous $CO_2$ dissolving into aqueous phase $CO_2$; and (3) $MEA^+$ reaction with aqueous $CO_2$ to form MEA carbamate. The controlling step is the diffusivity of gaseous $CO_2$ into liquid.

However, with the present mixed amine/ammonia solvent, the controlling step is shifted to amine hydrolysis due to the catalytic reaction with ammonia and gaseous $CO_2$ to form, for example, ammonia carbamate (in the case where the amine is MEA) through the following fast reaction: $2NH_3 + CO_2 = NH_7COONH_4$. Subsequently, the transfer of the carbamate ion to MEA forms MEA-COO at a relatively high pH. At a lower pH, ammonia will react with $CO_2$ to form ammonium bicarbonate which will result in higher carbon loading in the carbon-rich solution exiting the scrubber. High carbon loading results in high $CO_2$ partial pressure in the stripper, advantageously reducing the carrying gas demand for $CO_2$ desorption. As will be described, the present hybrid solvent increases $CO_2$ mass-transfer flux between solvent and flue gas by 70% compared to conventional solvents.

The presently described solvent and processes for its use include also the use of an additional stripping carrier which is immiscible in water and possesses a latent heat/heat of vaporization less than that of water. Typically, stripping carriers having a normal boiling point of less than 90° C. are contemplated. In particular embodiments, pentane or isomers thereof are provided as an additional stripping carrier. As an example, the low boiling point of pentane (36° C.) allows further heat integration to utilize the abundant low-quality energy which, in conventional processes, is currently rejected into the environment through power plant cooling towers. Pentane may be used as the coolant to recover rejected heat from the steam turbine condenser, which accounts for an energy penalty of more than 35% for electricity generation in existing utility power plants.

In one embodiment, the scrubbing solvent of the present disclosure for use in the foregoing process comprises approximately 30 wt % MEA and less than 3 wt % of $NH_3$. Advantageously, the reduced fraction of $NH_3$ in the solvent minimizes ammonia slip at the scrubber and stripper exhaust streams. In particular, ammonia reduces $SO_2$ levels to a suitable concentration to minimize MEA degradation, through the reaction of

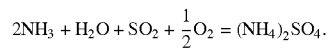

$$2NH_3 + H_2O + SO_2 + \frac{1}{2}O_2 = (NH_4)_2SO_4.$$

The resulting solution can then be cooled, precipitating sulfate solids for removal.

Ammonia vapor acts also as a carrier gas. Since temperatures in a stripper are typically above 60° C., ammonium carbon-compounds will dissociate into $NH_3$, $CO_2$ and $H_2O$ which will reduce the $CO_2$ vapor pressure in the stripper. As well, ammonia enhances reaction kinetics and acts also as a reagent to increase solvent capacity. Gaseous $CO_2$ will quickly react with ammonia to form ammonia carbamate through the reaction $2=NH_3+CO_2+=NH_2COONH_4$ then transfer the carbamate ion to MEA to form MEA-COO. Later, at low pH ammonia will react with $CO_2$ to form ammonium bicarbonate which will result higher carbon loading in the solution. High carbon loading results in high $CO_2$ partial pressure in stripper dropping the carrying gas demand for $CO_2$ desorption. Further, a high carbon capacity results in smaller equipment and less capital investment. Ammonia acts also as a proton donor in the form of $NH_4^+$ through the hydrolysis to balance MEA-COO charge and free another MEA for $CO_2$ capture.

According to the present disclosure, a low latent energy chemical such as pentane or an isomer thereof is used, for example in a desorber, as an additional stripping gas for solvent regeneration, and may be recycled internally within the stripper to eliminate foaming concerns in the scrubber. At ambient pressure (1 atm), the boiling point of pentane is 36° C. (100° C. for water); and the latent heat of vaporization is 26 kJ/mole (40 kJ/mole for water). At same time, a few pentane isomers have boiling points of less than 10° C. The solubility of pentane in water is ≤0.004%. The low boiling point of pentane thus provides a possible opportunity for further heat integration to utilize the abundant low-quality energy which is currently rejected into the environment through power plant cooling towers. Pentane or other such chemicals could then also be the coolant to recover rejected heat from the steam turbine condenser, which accounts for a more than 35% energy penalty for electricity generation in existing utility power plants. That is, the use of low latent energy chemicals such as pentane or isomers thereof for solvent regeneration (to displace steam as is conventional) will allow recovery of low-temperature heat from steam turbine condensers and other low-quality heat sources which are currently simply diverted to cooling towers as waste energy. A conservative estimate is that approximately 40% of the heat requirement of the presently described $CO_2$ capture system could be derived from power plant waste energy.

Example 1

Experiments were carried out using a bench scale laboratory stripping apparatus 10 (FIG. 1). Five (5) M monoethanolamine (MEA) solutions were loaded with $CO_2$ at levels typical of emissions from a commercial $CO_2$ capture system absorber (Table 1). Pentane was used as a stripping gas.

A dual-shell stripper 12 was provided, with an outer shell 14 and an internal shell 16 including an internal, packed reaction column 18 tilled with mesh metal rings (not shown). The shell side of the stripper 12 was heated by means of circulating oil. $CO_2$ loaded amine solution was preheated and pumped to a top 20 of the stripper 12. Liquid stripping carrier (5 M MEA) was pre-heated and pumped through a bottom of the packed reaction column 18, and therefrom through a set of heating coils (evaporator 22) disposed at a bottom of the stripper 12. The vaporized carrier, the $CO_2$ gas stripped from the solvent, and water vapor from the solvent exited the top 20 of the stripper 12 into a condenser 24 where the carrier and water vapor were condensed back into a reservoir 26.

The stripped $CO_2$ gas was sent to a gas analyzer (not shown). For analysis, nitrogen ($N_2$) gas was used as a sweep gas to dilute the pure product $CO_2$ to a level that could be analyzed (<20 vol %). Carbon-lean solution was collected in a lean solution reservoir 28 disposed downstream of the stripper 12. The immiscibility of the carrier with water resulted in a two phase solution which allowed for easy separation. Separated water was mixed together with pre-steady, steady state and residual solutions, weighed, and transferred to a carbon-rich solution reservoir 30 prior to beginning another cycle. The cycles were repeated until there was no significant difference in the carbon loading of the pre- and post-stripped samples.

The impact of the stripping carrier was examined at different temperatures by comparing with control conditions when no carrier was used. The temperature was measured by an in-line thermocouple for the solution exiting a bottom of the stripper 12. The experiments were performed at volumetric flow ratios of 1:3 of carrier:MEA solution. The flow rate of the carrier was also increased to determine its impact on stripping.

Table 1 summarizes the experimental conditions used. In Table 1, experiments designated with prefixes N and C represent those conducted without carrier and with carrier, respectively. The numbers at the designation end are temperatures of solution exiting the scrubber.

TABLE 1

Experimental Conditions for $CO_2$ Stripping in 5M MEA solution.

| Experiment | Temperature Scrubber Bottom (° C.) | MEA flow rate (ml/min) | Carrier flow rate (ml/min) | Initial carbon loading (mol $CO_2$/ kg sln.) |
|---|---|---|---|---|
| N-90 | 90 | 60 | — | 2.26 |
| C-90 | 90 | 60 | 20 | 2.26 |
| C-82 | 82 | 60 | 20 | 2.26 |
| N-100 | 100 | 60 | — | 2.26 |
| C-100 | 100 | 60 | 20 | 2.16 |

Figure 2:
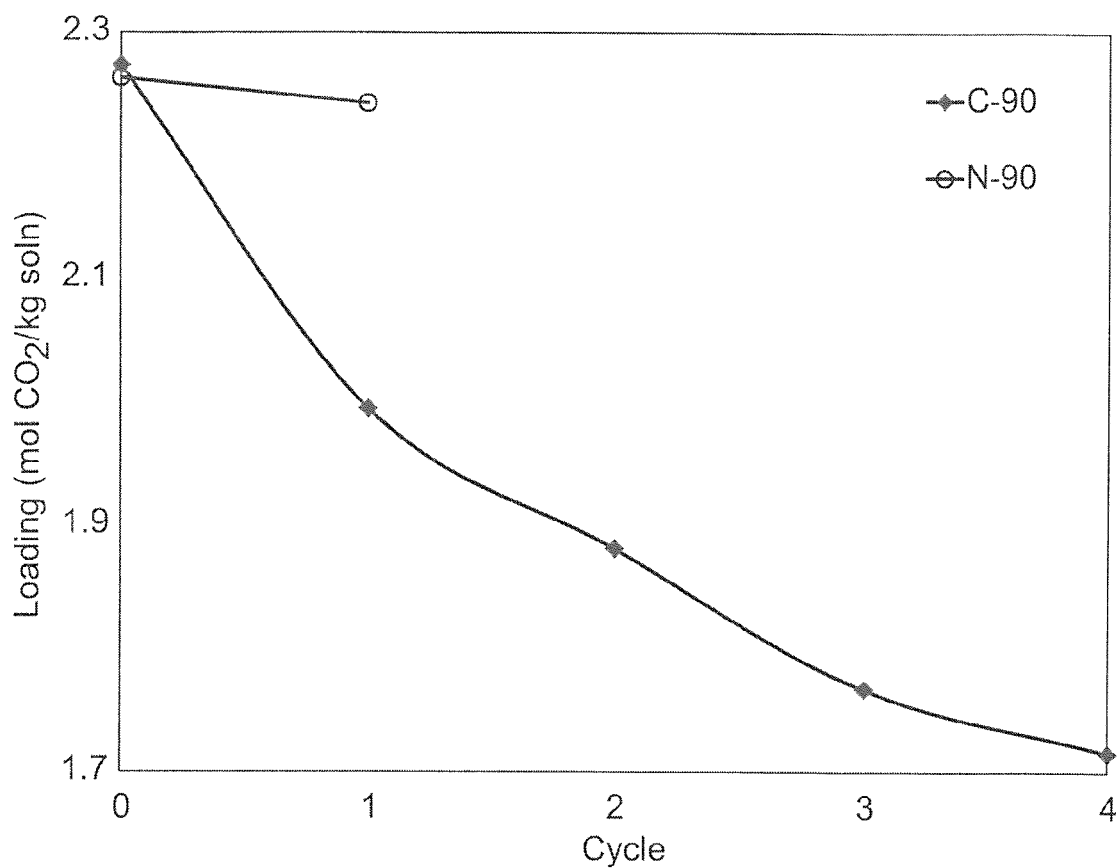
FIG. 2 graphically depicts carbon loading for successive $CO_2$ stripping cycles using 5 M MEA solvent at 90° C.
Figure 3:
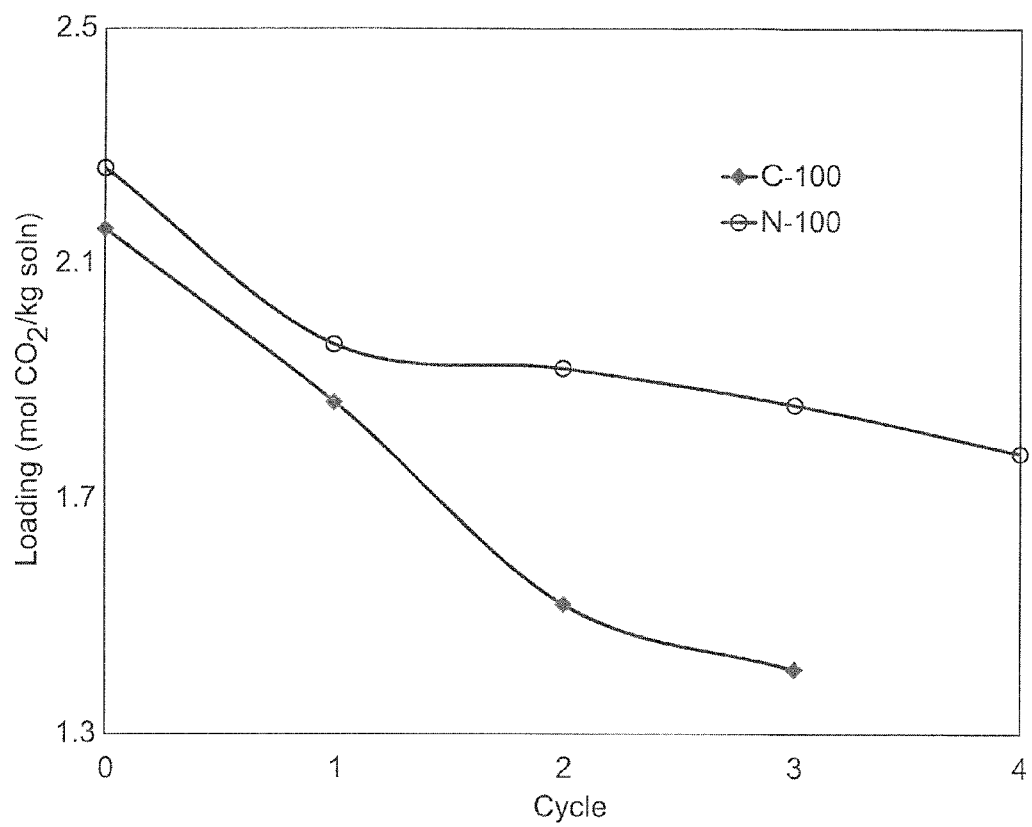
FIG. 3 graphically depicts carbon loading for successive $CO_2$ stripping cycles using 5 M MEA solvent at 100° C.

To compare stripping efficiency, the carbon analysis of the liquid samples for the various cycles was used. The carbon loading was compared for the control and carrier experiments at 90 and 100° C. for successive stripping experiments (see FIGS. 2 and 3, respectively). In the 90° C. experiments (FIG. 2), the two control (no carrier) experiments shown did not show any appreciable difference in carbon loading for the successive cycles. The presence of the carrier, however, led to the sequential lowering of carbon loading. It was therefore shown that the present carrier enhanced the stripping of $CO_2$ from the MEA solution. Similarly, for the 100° C. experiment (FIG. 3), the presence of the carrier resulted in increased $CO_2$ stripping compared to the control.

Figure 4:
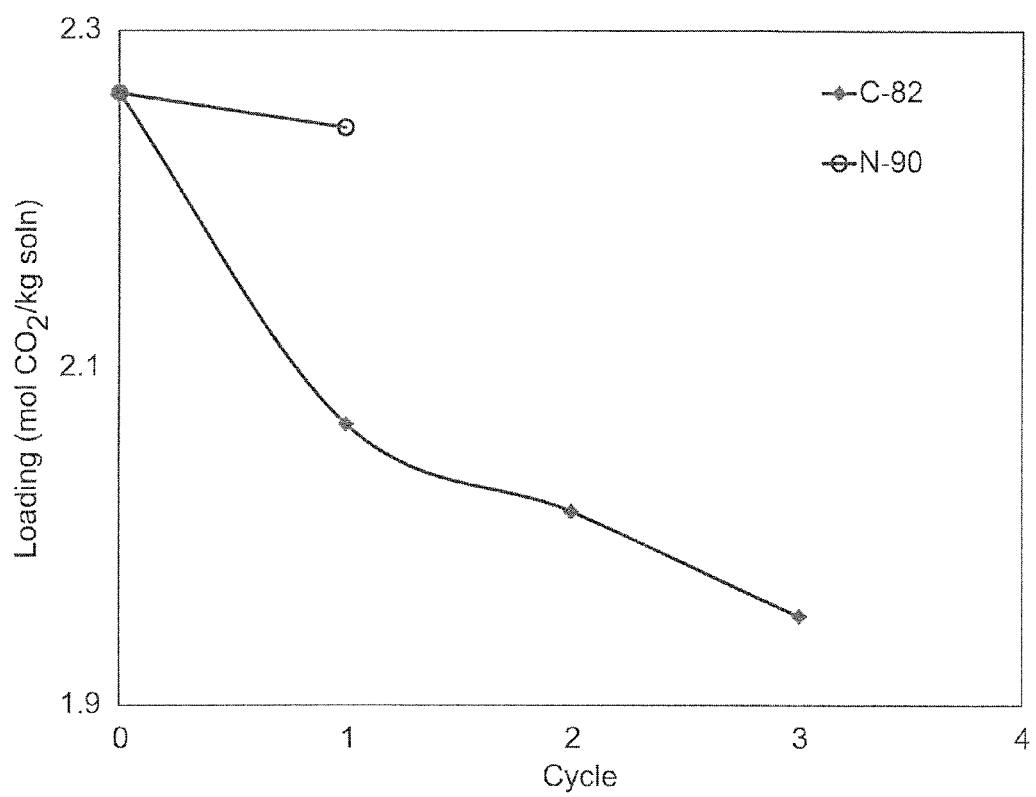
FIG. 4 graphically depicts carbon loading for successive $CO_2$ stripping cycles using 5 M MEA solvent at 82° C. and 90° C. for carrier and control experiments.

The presence of the additional carrier resulted in higher temperatures at the top 20 of the stripper 12 compared to the control experiments. This was due to the need for additional heat input in order to maintain the stripper 12 bottom temperature. In order to further demonstrate the effectiveness of the volatile stripping carrier an experiment was conducted where the same energy input was maintained resulting in a lower stripper 12 bottom temperature (depicted as C-82, see FIG. 4). As shown in FIG. 4, even at the lower temperature the carrier improved stripping of $CO_2$.

Figure 5:
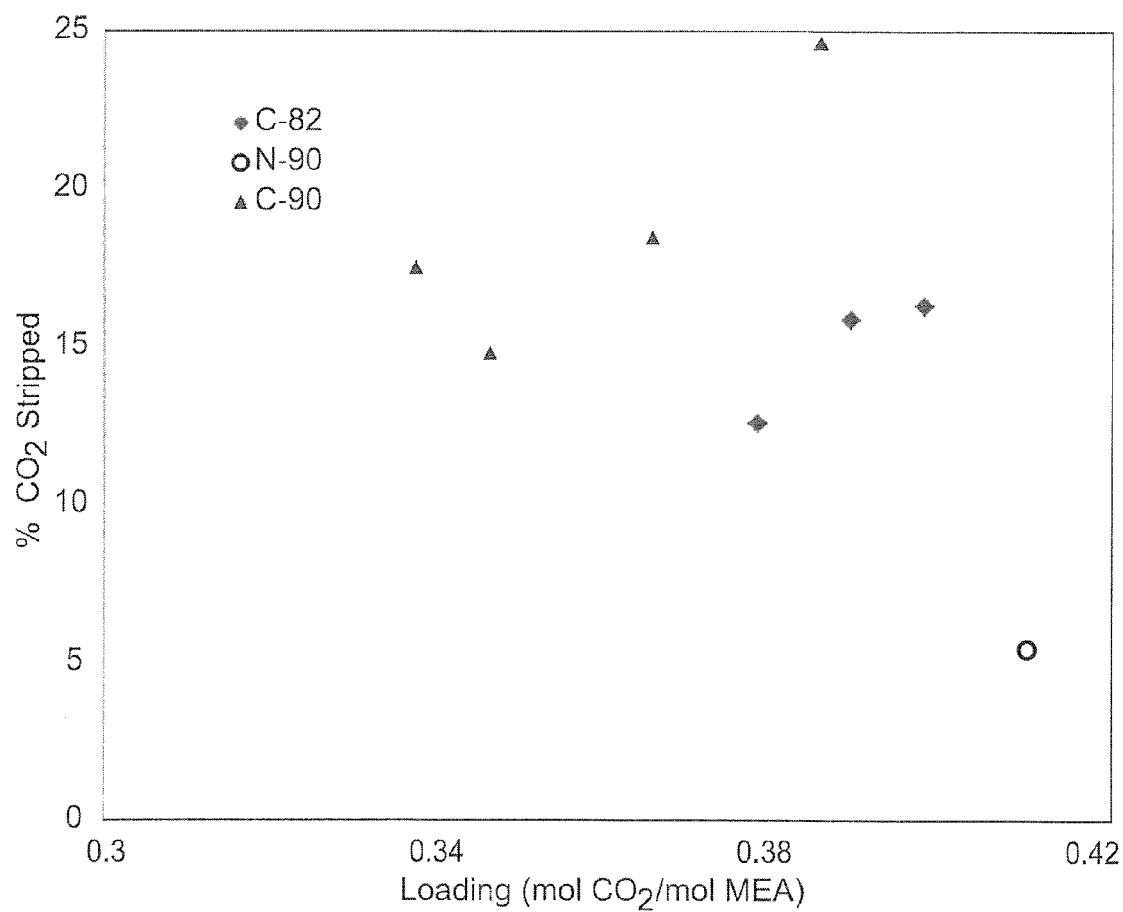
FIG. 5 graphically percentage of $CO_2$ stripped from 5 M MEA solvent as a function of loading (a) at the end of the stripping cycles at 82° C. and 90° C., with the starting solvent a being 0.45 for each experiment.

The amount of $CO_2$ stripped from the solution was estimated for each cycle of the low temperature experiments. For each run, the initial weight of the solution and the carbon loading (mol $CO_2$/kg solution) was used to obtain the initial total amount of $CO_2$ present in the solution. The weights and carbon loading of the pre-steady solution and solution collected at the end of the cycle were similarly used to approximate $CO_2$ retained in solution. This $CO_2$ balance was used to estimate the percentage of $CO_2$ stripped from the solution at the end of each cycle and the results are shown in FIG. 5. The initial solution loading α (ratio of moles of $CO_2$ to moles of amine) was 0.45 mol $CO_2$/mol MEA for each experiment. A minimal amount of $CO_2$ was stripped for the control experiment at 90° C. compared to the experiments with the carrier as previously noted. The general decrease of the percentage stripped from the solution with successive cycles corresponds to lowered driving force with decreasing $CO_2$ loading.

With the observed impact of the carrier at 90° C., the flow rate of the carrier was increased from 20 to 30 ml/min (a volumetric flow ratio of 1:2 of carrier to solution) to determine its effect. The percentage of $CO_2$ stripped from the solution for different initial carbon loadings are compared for the two different carrier flow rates for experiments at 82° C. (Table 2). The results show that increasing the flow rate of the carrier improved stripping by further lowering the partial pressure of $CO_2$ in the gas phase and contributing to increased driving force for stripping from the solution.

TABLE 2

Percentage of $CO_2$ stripped from 5M MEA solution
for different flow rates of carrier at 82° C.

| Carrier flow rate (ml/min) | Initial carbon loading mol C/kg soln | % $CO_2$ stripped from solution |
|---|---|---|
| 20 | 2.26 | 16 |
|  | 2.06 | 13 |
| 30 | 2.02 | 21 |
|  | 1.76 | 15 |

An overall regeneration ratio was estimated for the stripping experiments to estimate the relative overall improvement obtained due to the carrier and the potential energy savings that could be derived. This overall regeneration ratio was estimated as the percentage decrease between the initial carbon loading and the carbon loading at the end of 3 cycles (used for most of the experiments) for the 90° C. experiments which had the same initial carbon loadings for both carrier and control experiments. The relative improvement in stripping due to the carrier was about 20% for the 90° C. experiment.

Example 2

Figure 6:
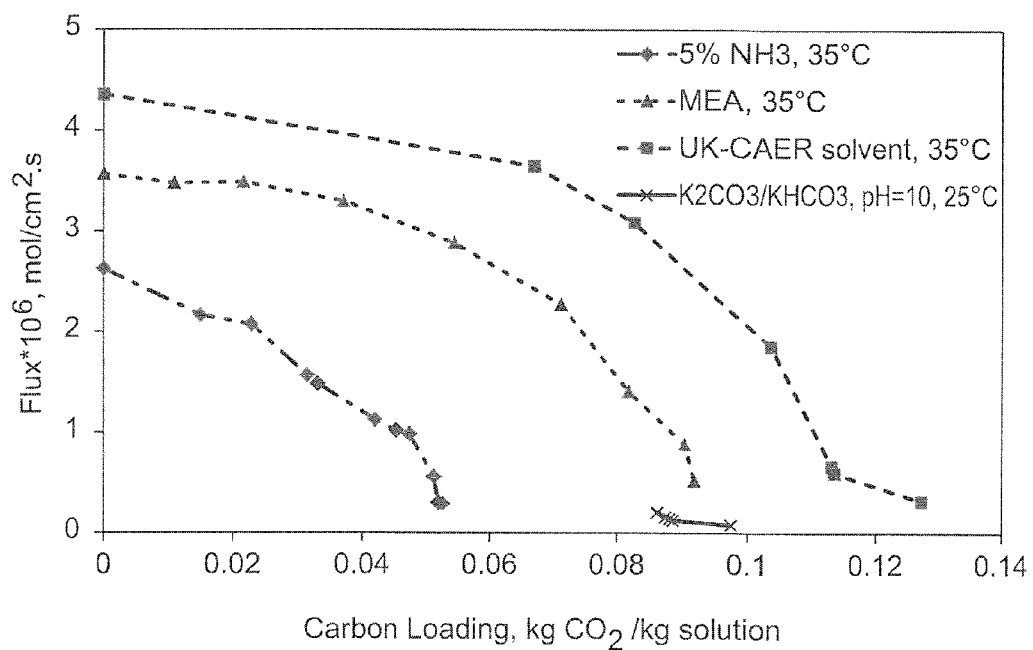
FIG. 6 shows kinetics of $CO_2$ adsorption by four solvent compositions.

A wetted wall column (WWC) experiment was used to evaluate kinetics of $CO_2$ absorption in various solvents. The results are presented in FIG. 6. Rates of absorption of $CO_2$ in four solvents (5% $NH_3$, MEA, the hybrid solvent designated "UK-CAER" solvent in the drawing figure, and $K_2CO_3$/$KHCO_3$) were measured. During the experiments, the gas flow rate was kept constant while a concentration of 14 vol % $CO_2$ was maintained, with the balance as $N_2$. Compared to MEA, $NH_3$ and $K_2CO_3$/$KHCO_3$ solvents, the hybrid solvent provided a significant advantage of mass transfer at the tested carbon loading. Additionally, the hybrid solvent achieved 60% higher capacity (0.13 kg $CO_2$/kg solution) compared to that of 30% MEA (0.09 kg $CO_2$/kg solution) while maintaining a reasonable mass-transfer coefficient which remained still much higher than that obtained from the solution mixed by $K_2CO_3$/$KHCO_3$.

Example 3

Figure 7:
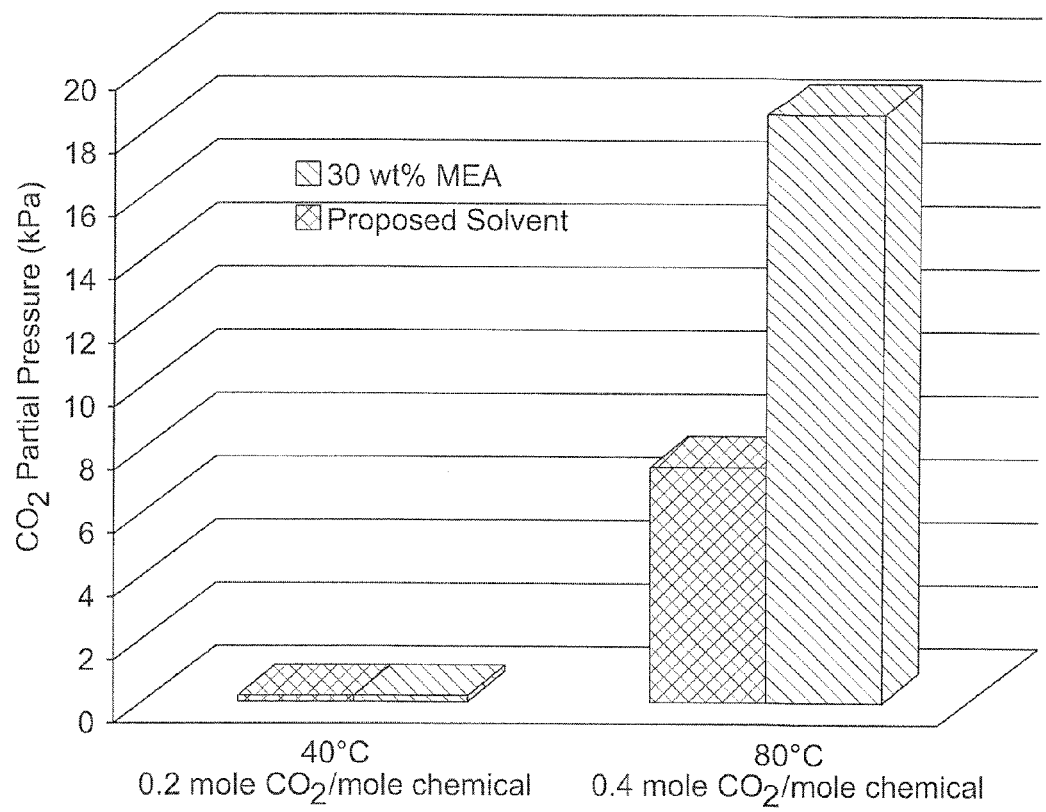
FIG. 7 presents comparison data from conventional MEA solvent (30 wt %) versus a solvent composition according to the present disclosure under varying operating conditions.

A Vapor-Liquid Equilibrium (VLE) experiment was conducted to determine the maximum carbon content in the carbon-lean solution (see Example 1) required for 90% efficiency in a scrubber, and also the minimum carrier gas flowrate required in the stripper for solvent regeneration at a given operating temperature. The results for two solvents, the present hybrid solvent and 30 wt % MEA, are provided in FIG. 7. At an operating temperature of 80° C., the $CO_2$ partial pressure of the hybrid solvent was 18.6 kPa, 2.5 times higher than that of 30 wt % MEA. At a lower temperature (40° C.), at the same carbon loading the $CO_2$ partial pressure of the present hybrid solvent was 0.2 kPa, which was comparable to that of 30 wt % MEA.

Example 4

Figure 8:
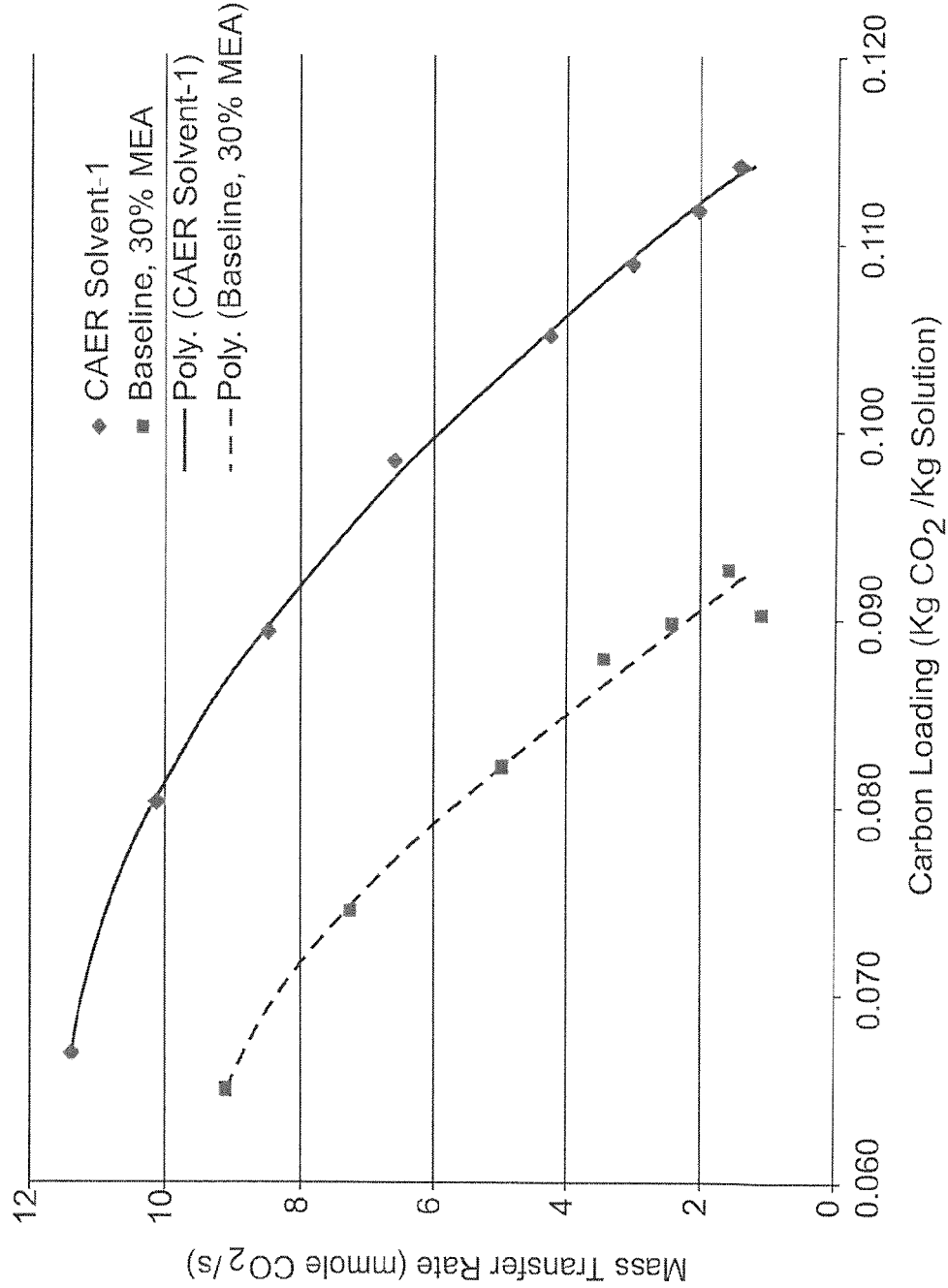
FIG. 8 presents comparison data for $CO_2$ adsorption with conventional MEA solvent versus a solvent composition according to the present disclosure in a bench-scale scrubber.

Further comparisons using a mini-scrubber system substantially as described in Example (see FIG. 8) showed that the present hybrid solvent exhibited significantly higher adsorption rates of $CO_2$ than an MEA-only solvent over the entire carbon loading spectrum which was evaluated. For instance, at a carbon loading of 0.09 kg $CO_2$/kg solution, under the same operating conditions (i.e., similar gas residential time, liquid/gas (L/G) ratio and column temperature), the mass-transfer rate of the present solvent was 8.2 mmole $CO_2$/s compared to 2.1 mmole $CO_2$/s of a 30% MEA solution. The working capacity for this particular hybrid solvent reached 0.114 kg $CO_2$/kg solution on the mini-scrubber apparatus used in the experiment.

Example 5

Figure 9:
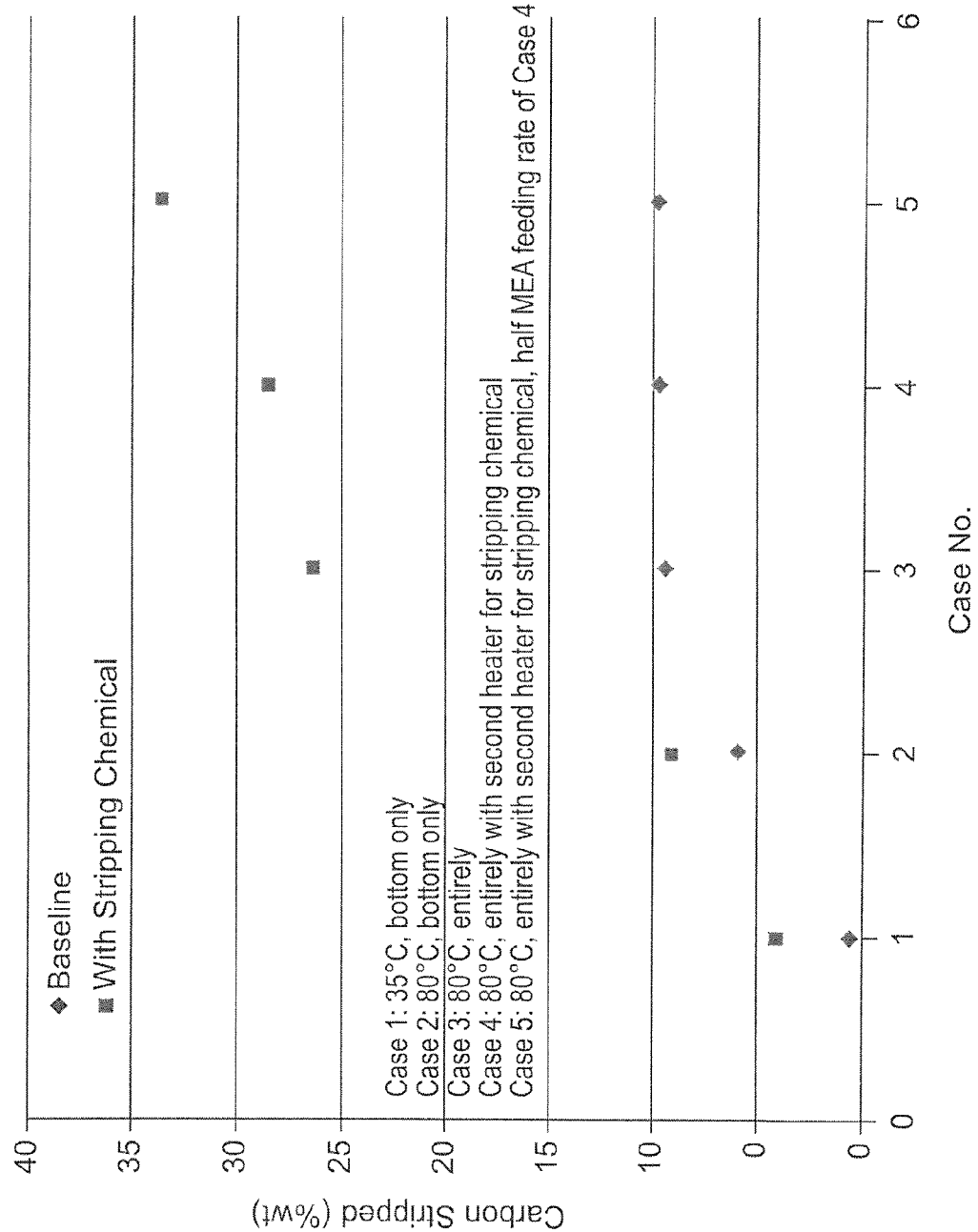
FIG. 9 shows the impact of inclusion of pentane as a stripping gas in a solvent composition according to the present disclosure compared to a reference solvent.

Next, the added impact of inclusion of a low latent energy chemical as a stripping carrier was evaluated. As shown in FIG. 9, at the same column operating temperature, inclusion of pentane vapor stripped an additional 25% $CO_2$ compared to a reference experiment without inclusion of pentane. Additionally, the energy needed for $CO_2$ dissociation was decreased between 29% and 35% (see Table 3). The power consumed per run was calculated for the present hybrid solvent, and compared to 30 wt % MEA alone.

TABLE 3

Energy Required for $CO_2$ stripping

| Test No. | Solution Pre-heating Temperature (° C.) | Stripper Operating temperature (° C.) | Energy Required of CAER Solvent referred to 30% MEA |
|---|---|---|---|
| 1 | 70 | 90 | 0.648 |
| 2 | 71 | 101 | 0.685 |
| 3 | 84 | 99.5 | 0.707 |

Figure 10:
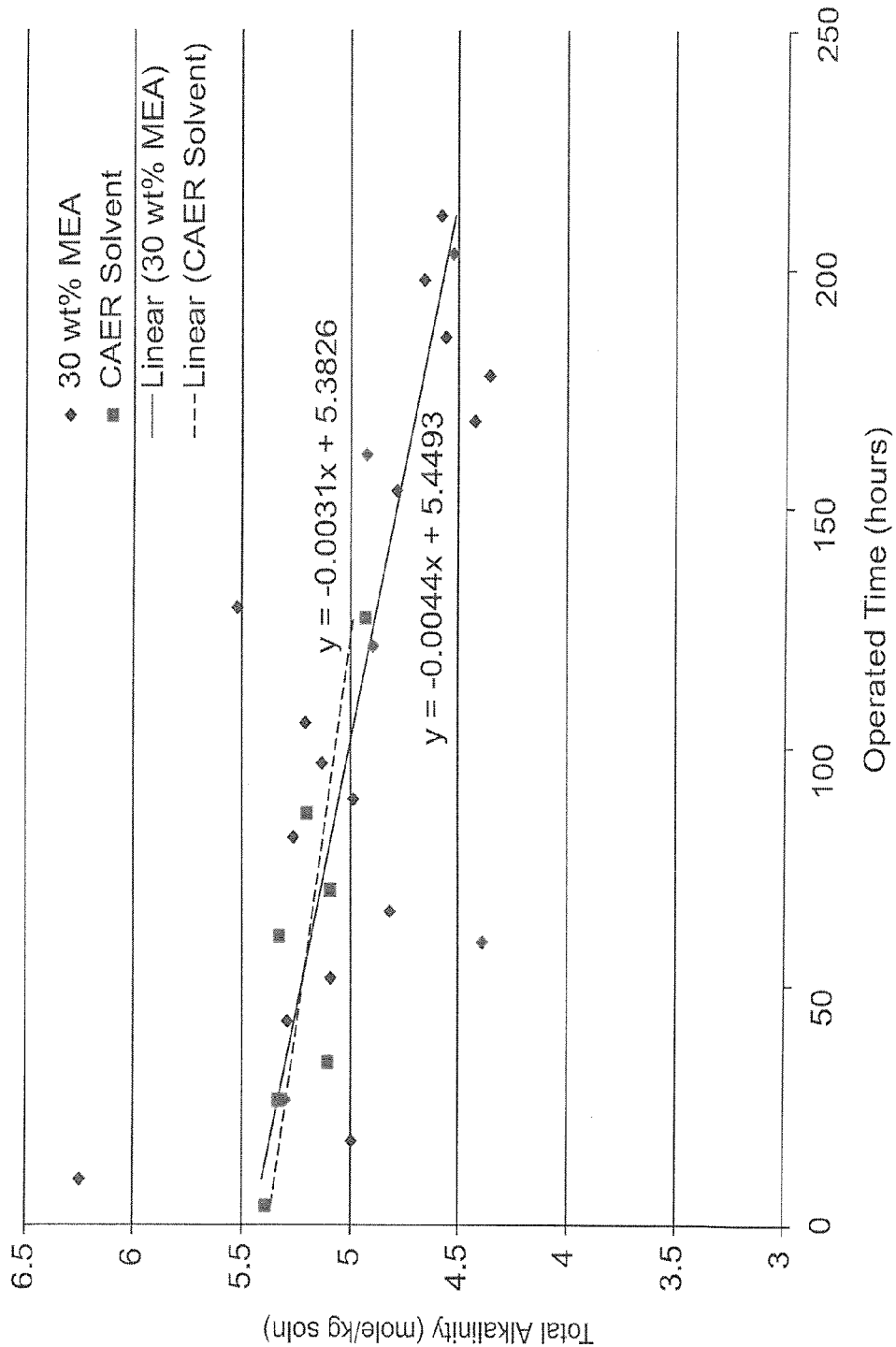
FIG. 10 depicts a comparison of solvent degradation rate for a conventional MEA solvent and a solvent according to the present disclosure.

As shown in Table 4, the present solvent provides significant advantages in theoretical and actual carbon capacity, solvent cyclic capacity, and reaction rate constant compared to that of a conventional solvent (30 wt % MEA). Further, the heat reaction for the present solvent, one of the energies required for solvent regeneration, is 30% less than that of MEA. As shown also in Table 4, the present hybrid solvent also exhibits reduced viscosity and surface tension compared to 30 wt % MEA. In turn, the degradation rate of the present hybrid solvent is expected to be slower than that of 30 wt % MEA because of the stabilizing effect of the included ammonia. This is shown in FIG. 10.

TABLE 4

Comparison of Solvent Properties between the hybrid solvent and commercial solvents

| Name | Formula | Molecular Weight g/mole | Boiling Point Celsius | Density g/cm$^3$ | Heat Capacity J/mol · k | Viscosity mPa · s | Surface Tension dynes/cm @ 20.7° C. | $\Delta H_{abs}$ kJ/gmol | Rate Constant at 25° C. M$^{-1}$s$^{-1}$ | Theoretical Max. Capacity kg $CO_2$/kg Solvent | Working Range kg $CO_2$/kg Solvent | Cost $/lb Chemical |
|---|---|---|---|---|---|---|---|---|---|---|---|---|
| Ammonia | $NH_3$ | 17.03 | −33.3 | 0.696 | 35.1 (gas) |  |  | 27-60 | 799 | 2.59 |  | 0.22 |
| Monoethanol-amine (MEA) | $C_2H_7NO$ | 61.08 | 171 | 1.018 | 195.5 |  |  | 84 | 6000 | 0.361 |  | 1.07 |

TABLE 4-continued

Comparison of Solvent Properties between the hybrid solvent and commercial solvents

| Name | Formula | Molecular Weight g/mole | Boiling Point Celsius | Density g/cm$^3$ | Heat Capacity J/mol·k | Viscosity mPa·s | Surface Tension dynes/cm @ 20.7° C. | $\Delta H_{abs}$ kJ/gmol | Rate Constant at 25° C. M$^{-1}$s$^{-1}$ | Theoretical Max. Capacity kg CO$_2$/kg Solvent | Working Range kg CO$_2$/kg Solvent | Cost $/lb Chemical |
|---|---|---|---|---|---|---|---|---|---|---|---|---|
| 30% wt MEA in water | | | | | | 3.21 | 61.85 | | | 0.108 | 0.064 (L) - 0.09 (R) | |
| CAER Solvent | | 48.43 | | 0.967 | | 2.80 | 60.14 | 70 | 12000 | 0.186 | 0.074 (L) - 0.124 (R) | |

\* under solid state, \*\*data from bubbing gas-liquid contactor, \*\*\*data from packed column contactor
L—Carbon Lean Solution, R—Carbon Rich Solution
Densities at 20 degrees Celsius, all other properties at 25 degrees Celsius
Solvent physical properties (from CRC).
All substances in the liquid phase unless otherwise noted Example 6

Figure 11A:
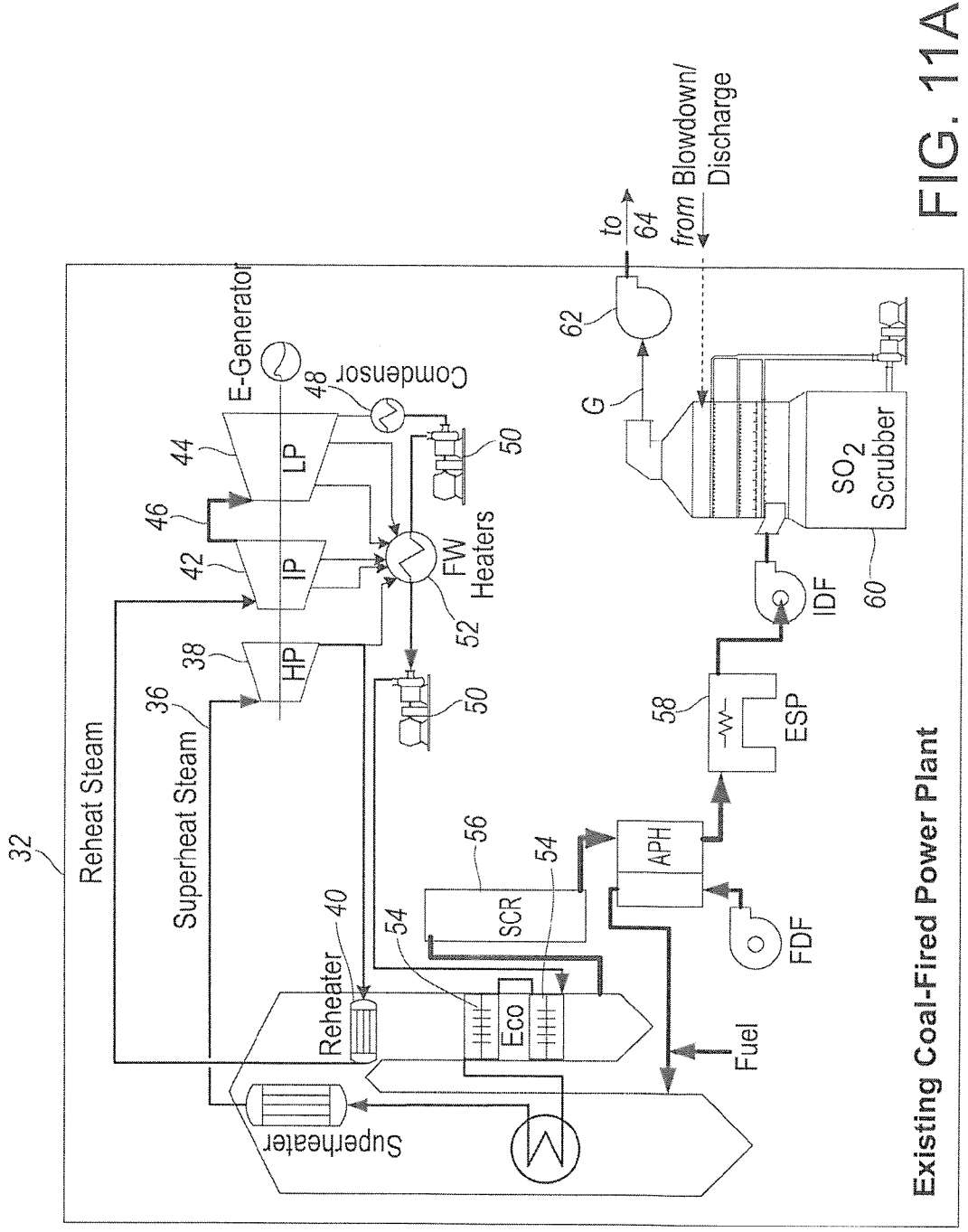
FIG. 11 schematically depicts integration of a $CO_2$ stripping system (FIG. 11B) according to the present disclosure into a pulverized coal-fired power plant (FIG. 11A).

The present technology, including the described hybrid solvent, can integrate readily into existing systems for stripping CO$_2$ from combustion gases. FIG. 11 illustrates a typical existing coal-fired power plant 32, and further depicts incorporation of a system 34 and method for carbon capture from combustion gases from such a power plant utilizing the above-described hybrid solvent. For the steam-side process, superheated steam 36 drives a high-pressure turbine 38 first for power generation, before returning to a reheater 40 to bring steam temperature back to over 540° C. depending on the steam cycle specifications and boiler design. The reheated steam then enters one or more intermediate-pressure turbines 42 and low-pressure turbines 44 for additional electricity generation. The steam pipe connecting intermediate-pressure turbine 42 exhaust and low-pressure turbine 44 inlet, crossover section 46, is where the steam for solvent regeneration in the CO$_2$ capture process is extracted. The exiting saturated steam from low-pressure turbine 44 is condensed in a water-to-steam heat exchanger (condenser 48). The condensate is pressurized via feedwater pumps 50, heated up via feedwater heaters 52 and economizers 54, and subsequently fed back to the reheater 40 completing the steam cycle.

For the gas-side process, after the coal is combusted in low-NOx burners, the combustion gases leave the boiler and are treated in a NOx removal device called a Selective Catalytic Reducer (SCR) 56. After the SCR, the gas is further treated in the fly ash removal device, in this case an Electrostatic Precipitator (ESP) 58, to remove particulate matter. After this, the gas will travel through an SO$_2$ removal device 60 (SO$_2$ scrubber). It is at this point that carbon capture process begins.

The proposed process includes an in-duct flue gas cooler, a pre-treatment tower, a packed column scrubber with solvent recovery column, a packed-bed stripper with reboiler and reclaimer, several heat exchangers for sensible heat recovery, several pumps for liquid recirculation, and a filtration device to remove entrained slurry droplets from the SO$_2$ scrubber and solids formed during the process. Specifically, after exiting the SO$_2$ scrubber 60, flue gas G enters a forced draft fan 62, which boosts its pressure to overcome the pressure drop occurring inside the downstream scrubbing components. At this point, the flue gas G is saturated with water at a temperature of about 55° C. The pressurized flue gas G proceeds through an in-duct direct water contactor 64 to cool the flue gas G to 30° C. The cooled flue gas G then enters a counter-flow pre-treatment tower 66 which uses diluted ammonia solution for SO$_2$ removal. The pretreatment tower 66 will polish the flue gas G to less than 10 ppm SO$_2$ to minimize the formation of amine heat-stable salts. Subsequently, the SO$_2$ polished flue gas G enters a CO$_2$ scrubber 68 where it is contacted in a counter-current manner with a scrubbing carbon-lean solution from a stripper 70. The gaseous CO$_2$ reacts with aqueous hybrid solvent according to the present disclosure to form ionic carbon species in the scrubber 68. As described above, this hybrid solvent includes a low fraction of an ammonia additive to enhance CO$_2$ capture mass-transfer flux and increase the carbon carrying capacity. The scrubber 68 is equipped with an intermediate cooler and a water-cooled bottom tank which is used to remove the heat generated during CO$_2$ capture process.

Prior to the stack, CO$_2$ depleted flue gas from the CO$_2$ absorber will be treated by ammonia-free condensate from an in-duct flue gas cooler 72 for ammonia removal. After the gaseous CO$_2$ is converted into aqueous carbon species, the carbon-rich solution travels from the bottom of the scrubber 68, is pressurized, and is sent to a rich-lean solution heat exchanger 74 for sensible heat recovery prior to going to the stripper 70 for solution regeneration. Once the carbon-rich solution exits the heat exchanger 74, it is sent to the stripper 70. The solution is sprayed in the top of the stripper 70 with stripping gas to strip the CO$_2$ to form a carbon-lean solution which is recycled back to the scrubber 68. At the stripper 70 exhaust, two heat recovery units 76, 78 are installed to recover the water vapor and carrier gas while their sensible heat is fully recovered by carbon-rich solution pumped from the CO$_2$ scrubber 68. A majority of the steam and other chemicals from the stripper 70 is condensed in the first heat recovery unit 76 and the condensate is returned to the top of the stripper 70 as a reflux stream. The second heat recovery unit 78 condenses the proposed chemical additives for the next stripping cycle. Subsequently, the CO$_2$ enriched gas stream is pressurized, intercooled and compressed for downstream utilization or sequestration (depicted as reference numeral 80).

Thus, it is shown that the presently described hybrid solvent and process for using it provide, compared to conventional solvents for CO$_2$ re-capture, increased carbon capacity, CO$_2$ capture reaction rate, reduced stripper energy due to higher volatility in the stripper, and reduced SO$_2$ emissions levels in pretreatment due to pre-treatment. Significant advantages are provided by the described hybrid solvent compared to conventional CO$_2$ re-capture technology, i.e., 30 wt % MEA. For example, the hybrid solvent provides a mass-transfer flux 2 times faster than 30% MEA. High mass-transfer flux will allow use of a smaller CO$_2$ absorber to capture the same amount of CO$_2$ from a flue gas stream. Overall, the present hybrid solvent is expected to reduce the volume of the required $CO_2$ absorber by 70% as compared to the reference case of the 30% MEA system, resulting in a 50% savings on the absorber capital cost.

The hybrid solvent also provides a high test-confirmed carbon capacity (0.12 kg $CO_2$/kg solvent as compared to 0.09 kg $CO_2$/kg for 30% MEA). This higher capacity results in at least three direct benefits:

a) Reduction of liquid recycling rate between the absorber and stripper by at least 50%. This is projected to have a 30% saving on balance of plant (BOP) capital cost including smaller heat exchangers, and pumps. The low liquid recycling rate also is expected to result in at least 25% electricity saving for BOP operations.

b) Increasing $CO_2$ dissociated partial pressure by 40%, which will require less carrying gas to strip the same amount of $CO_2$ at the top of the desorber. It is projected to reduce the gas required for stripping by 15%.

c) Reducing stripper size. It is projected that the present hybrid solvent could save 35% on capital cost of stripper fabrication and construction.

The decomposition enthalpy of ammonia bicarbonate is approximately ⅓ that of MEA carbamate. In the present hybrid solvent, approximately 15% of the carbon in the carbon-rich solution prior to passage through a stripper is in the form of bicarbonate. Therefore, the projected energy requirement for carbon-compound decomposition could be reduced by 10% according to the calculation [15%×(1−⅓)].

Moreover, the low viscosity and surface tension of the present hybrid solvent also may reduce the demand placed on a flue gas booster fan power prior to $CO_2$ scrubber due to less pressure head required. It is estimated this could save 10% of auxiliary electricity around $CO_2$ capture system. In turn, while net power output is likely to remain unchanged, the baseline PC plant using the present hybrid solvent as a post-combustion $CO_2$ reagent is expected to emit 15% less carbon dioxide into the atmosphere due to less auxiliary power and energy required for $CO_2$ capture.

In turn, the inclusion of a low latent energy chemical as a solvent-regenerating stripping gas reduces stripping energy due to its higher volatility. For example, the application of pentane as an additional stripping gas can save 25% energy for evaporation due to the low latent energy according to the calculation $$\frac{40 \text{ kJ} - 26 \text{ kJ}}{[40 \text{ kJ}]}.$$

Such inclusion of pentane or isomers thereof also allows for the recovery of low-temperature heat from the steam turbine's condenser and other low-quality heat sources currently rejected to the cooling towers.

The foregoing description of preferred embodiments of the invention has been presented for purposes of illustration and description. They are not intended to be exhaustive or to limit the invention to the precise form disclosed. Obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled. In turn, the drawings and preferred embodiments do not and are not intended to limit the ordinary meaning of the claims in their fair and broad interpretation in any way when interpreted in accordance with the breadth to which they are fairly, legally and equitably entitled.

What is claimed:

1. A process for removal of $CO_2$ from a post-combustion gas, including:
    a scrubbing step comprising contacting said post-combustion gas with a scrubbing solvent comprising an amine and up to 3 wt % of ammonia to absorb $CO_2$ and provide a carbon-rich scrubbing solvent; and
    a stripping step comprising contacting said carbon-rich scrubbing solvent with a stripping carrier having a low latent heat energy to provide a carbon-lean scrubbing solvent;
    wherein the stripping carrier is one of n-pentane, iso-pentane, or n-hexane.

2. The process of claim 1, wherein the stripping carrier is n-hexane.

3. The process of claim 1, wherein said carbon-rich scrubbing solvent is contacted with said stripping carrier in a stripping column.

4. The process of claim 3, further including subjecting the carbon-rich scrubbing solvent to a plurality of stripping steps prior to a step of returning the carbon-lean scrubbing solvent to the scrubbing step.

5. The process of claim 1, wherein the amine is selected from the group consisting of monoethanolamine (MEA), 2-Amino-2-methylpropanol (AMP), methyldiethanolamine (MDEA), piperazine (PZ), diglycolamine (DGA), ethylenediamine (EDA), tri(Hydroxymethyl)aminomethane (THAM), diethanolamine (DEA), di-isopropanolamine (DIPA), and an amino acid.

6. The process of claim 5, wherein the amine is monoethanolamine.

7. The process of claim 6, wherein the scrubbing solvent includes substantially 30 wt % MEA and up to 3 wt % of ammonia.

* * * * *